3,564,085
METHOD FOR MAKING HEAT SEALABLE FOAMS
Erich Schickedanz, Illereichen-Altenstadt, Germany, assignor to The Schoff Mfg. Co., Inc., Chicago, Ill., a corporation of New York
Filed Nov. 17, 1966, Ser. No. 595,236
Int. Cl. B29h 8/00
U.S. Cl. 264—47            3 Claims

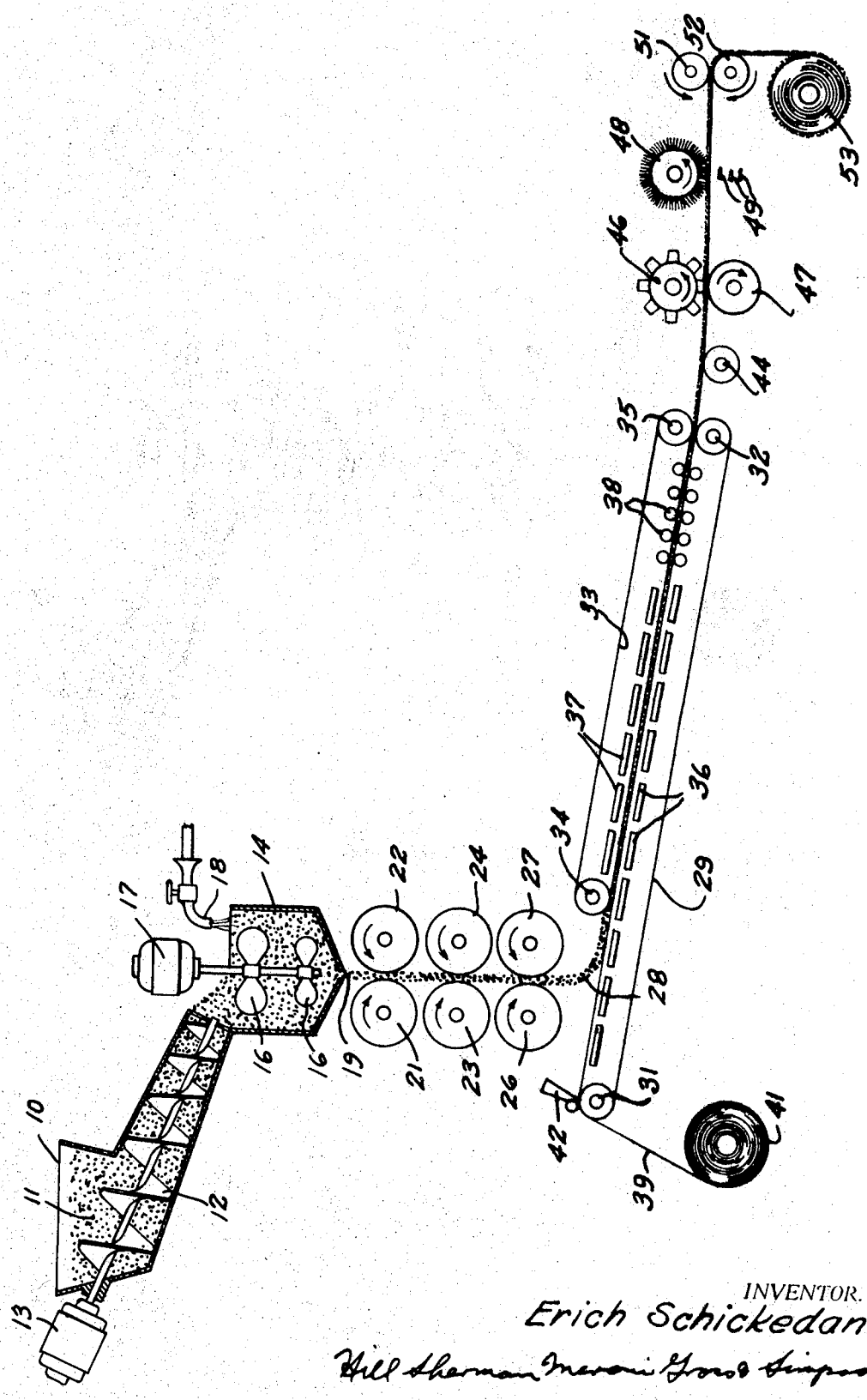

ABSTRACT OF THE DISCLOSURE

A method of forming a heat and high frequency sealable foam composition by mixing discrete particles of a non-heat-sealable polyurethane foam and a heat gellable plastisol of polyvinyl chloride thermoplastic resin. The mixture is pressed into a sheet and heated to the gelling temperature of the plastisol to form the heat sealable and high frequency sheet.

---

The present invention relates to the production of foams which are to be made sealable by the application of heat or high frequency energy.

Resinous foams, of which polyurethane foams are the prime example, are not ordinarily heat sealable to synthetic resin films. In the past, it has been suggested that such foams could be made heat sealable by impregnating the same with thermoplastic resins, the heat sealability of the resin being employed to provide the resulting composite with heat sealing properties. Such methods, however, require that the foam be either of the open pore type, or that the foams be rendered open pored chemically or mechanically, i.e., for purposes of impregnation. These methods are rather expensive and complicated and make the production of the heat sealable foam product rather difficult.

It is also difficult to make sheets or continuous products of improved rigidity and high specific gravity by this type of method, since it requires using as a starting material a foam of higher specific gravity which is more difficult to impregnate. It also requires the use of a relatively large amount of the thermoplastic impregnant, which in turn adds to the difficulty because the heavier foams are normally of a very fine porous structure and are therefore difficult to impregnate.

The present invention provides an improved method and apparatus for producing a heat sealable and high frequency sealable product employing a foam which is not normally heat sealable. With the method and apparatus of the present invention, a wide variety of foam products can be produced with considerably greater ease than previously.

One of the objects of the present invention is to provide a method for the production of the sheet foam material having heat and high frequency sealable properties in a continuous manner.

Another object of the invention is to provide a method for the treatment of resinous foams with a thermoplastic binder material under conditions in which the resulting product retains a controlled amount of the binder, and the binder is thoroughly and uniformly distributed throughout the sheet.

Still another object of the invention is to provide a method for the manufacture of a heat sealable resinous foam which can make use of foam particles as a starting material, so that it provides an effective means for utilizing foam scrap material.

Still another object of the invention is to provide an improved foam product having a skeleton which makes it faster and easier to heat seal than other foam products having the same amount of thermoplastic impregnant.

A further object of the invention is to provide an improved apparatus for the continuous manufacture of a heat sealable foam product.

In accordance with the present invention, the heat and high frequency foam can be produced by providing a mixture of discrete particles of a foam (which may be scrap particles) with a thermoplastic resinous binder, consolidating the remixture into sheet form, and solidifying the binder to provide a self-sustaining, heat and high frequency sealable sheet material.

The foam materials which can be processed according to the present invention include the polyurethane foams, phenolic foams, urea-formaldehyde foams, and other thermosetting foams, and also includes foam rubber although the use of the latter material is not as preferable as polyurethane, for eaxmple, because of the limitation on the temperatures at which the foam rubber can be treated. Generally speaking, then, any foam material which is difficult or impossible to heat seal can be benefitted by the process of the present invention.

While the particle size is not particularly critical, it is preferred to use foam particles having maximum dimensions on the order of 1 to 10 millimeters. Such particle sizes can be provided without difficulty from scrap foam by shredding, milling or the like. It is, of course, possible to use foam particles produced specifically for this purpose, but the process is most economical when the readily available scrap materials are employed as a starting material.

The thermoplastic binder which is employed in the process of the present invention can be any of a wide variety of thermoplastic resins, since the chemical reactivity of the resin does not enter into its suitability. The most highly preferred resin binder is polyvinyl chloride in the form of a plastisol. In addition, the thermoplastic resins can be used in the form of latices, dispersions, emulsions or pastes with or without plasticizers. In general, then, any thermoplastic binder material can be used which has the ability of solidifying either by thermal treatment and cooling or solvent evaporation to form a heat sealable binder for the foam particles.

The relative proportions of foam particles and thermoplastic binder will vary substantially, depending upon the characteristics desired in the final product. Generally speaking, an amount of binder ranging from 50 to 500% by weight of the foam particles will provide a sheet material of the most suitable characteristics.

The differences between the product of the present invention and that of the conventional impregnated foam are usually quite discernible by microscopic examination. When there is a relatively large proportion of particles to binder, the particles are pressed together in the sheet with the thermoplastic binder forming only a thin coating around the walls of the particles, and partially impregnating them. This type of structure can be made very porous and is suitable for those applications where the foam must retain the capacity of "breathing."

The addition of large amounts of binder in relation to the amount of foam particles present produces a material which is far less porous but which is considerably more rigid and more dense. With a large amount of thermoplastic binder present, some of the particles can actually appear as entrapments in a continuous matrix of the thermoplastic binder.

There are several methods for producing the improved heat sealable foam of the present invention, the selection of which will depend primarily upon the type of foam being treated and upon the properties desired in the product. The particularly preferred method is illustrated in the drawing which shows in a somewhat schematic form, an apparatus for continuously manufacturing a sheet material.

As shown on the drawings:

In the single figure, the reference numeral 10 is applied to a hopper in which there are particles 11 such as polyurethane foam. A screw conveyor 12 driven by a motor 13 delivers the foam particles continuously to a mixing chamber 14. Within the mixing chamber there is an agitating means such as a pair of agitating vanes 16 driven from a motor 17. In the mixing chamber 14 there is also introduced a thermoplastic binder composition as by means of a spigot 18. In the mixing zone, the particles and the binder are thoroughly mixed and then are discharged through an orifice 19 to a plurality of pairs of rollers. The first pair of rollers 21 and 22 initially consolidates the mass, whereupon rollers 23 and 24 further consolidate the mass and work the thermoplastic binder into the pores of the foam particles. A final set of rollers 26 and 27 delivers a sheet 28 of a coherent mixture of foam particles and thermoplastic binder to the heat treatment stage to be subsequently described.

It is preferable that the three pairs of rollers, shown in the drawings, be heated to different temperatures. For example, rollers 21 and 22 can be at a temperature of about 40° C., rollers 23 and 24 at a temperature of about 80° C., and rollers 26 and 27 at a temperature of about 120° C.

Passage between the pairs of rollers causes the thermoplastic binder to be pressed into the foam cell structure, and causes a uniform impregnation of the structure by compression of the foam particles, combined with breaking up of closed cells which exist in the foam.

In the event that a polyvinyl chloride plastisol is used as the binding agent, the temperature existing at the rollers 26 and 27 will cause a certain amount of pre-gelling which facilitates the subsequent gelation of the mixture in the heat treating zone.

The foam-binder mixture which is still in a flaky form in the sheet 28 is then applied to a slanted conveyor belt 29 disposed between a pair of driven rollers 31 and 32. A second conveyor belt 33, extending between driven rollers 34 and 35, runs at the same speed as the conveyor belt 29. The conveyor belt 33 is adjustably positionable with respect to the belt 29 so as to provide a predetermined gap between the two belts, thereby regulating the thickness of the sheet product. The material on the conveyor belt 29 is heated by means of heater elements 36 located beneath the upper run of the belt, while the belt 33 is heated by means of heater elements 37. The space between the heater elements 36 and 37 defines a curing zone in which the sheet of foam plus binder assumes the characteristics of the final product. Typically, the sheet 28 is heated to a temperature of about 140 to 180° C. in the heat treating zone to cause gelation or fusion of the binder. After this heat treatment, the sheet passes between the cooling coils 38 containing a circulating fluid or the like where the temperature is reduced below the gelation temperature.

The conveyor belt 33 may be contoured or composed of wire mesh or the like, so that the foam sheet produced has a pattern on one or both sides.

In a further modification shown in the drawings, a web of embossed heat resistant paper 39 is unwound from the roll 41 and is trained over the upper run of the conveyor belt 29. In the event the conveyor belt is made of wire mesh, the paper web prevents foam particles from falling through the lower conveyor belt. Using this method, it is also possible to spread a thin layer of a plastic binder onto the paper web by means of a spreader 42. This film of binder would be pre-heated and pre-gelled by the heater elements 36 before coming into contact with the sheet 28.

It is also possible in this modification to use a web of aluminum foil or a rubber sheet and apply an adhesive to the sheet by the spreader 42 whereupon the mass of foam particles and binder is then laminated to the underlying web in the heat treating zone. The web in this instance may be profiled and the spreader 42 used to apply the gellable plastic in the spaces between the elevations of the profile contour. The resulting structure will then consist of a lattice-like perforated tape having the foam sheet secured to it. It is, of course, also possible to use a second laminating sheet applied to the upper conveyor belt 33.

The resulting sheet, after cooling by the coils 38, can be wound up on the roll and stored. Alternatively, the sheet can be cut immediately, without the use of the cooling coils 38, by passing it over a guide roller 44 and then passing it beneath a die cutter 46 operating against a backup roller 47. A rotating brush 48 then pushes the die cut articles 49 from the sheet, whereupon the remaining sheet passes between a pair of rollers 51 and 52 and is then wound on a takeup roll 53.

Many variations can be made in the composition of the sheet being manufactured. For example, the foam particles can be used in the form of flakes, grits, filaments, or blends of these materials. The foam particles may also contain textile or synthetic fabrics to increase the strength of the finished goods. The following specific examples are illustrative of the type of compositions which can be used for the production of car mats, floor coverings, sound and vibration reducing pads and the like.

EXAMPLE I

|  | Parts |
| --- | --- |
| Polyurethane foam granules | 100 |
| Dioctyl phthalate plasticizer | 100 |
| Polyvinyl chloride resin | 100 |
| Cadmium stabilizer | 2 |
| Fillers and pigments | 25 |

EXAMPLE II

|  | Parts |
| --- | --- |
| Polyurethane foam granules | 100 |
| 50% polyvinyl chloride dispersion | 200 |
| Dioctyl phthalate plasticizer | 80 |
| Emulsifier | 10 |
| Stabilizer | 2 |
| Fillers and pigments | 25 |

It should be recognized that the above formulae are purely typical and that the compositions can be varied over wide ranges depending upon the density of the product desired, its strength, and similar factors. It should be recognized, of course, that other thermoplastic resins besides polyvinyl chloride can be used, for example, acrylic resin emulsions. The same is true of the plasticizer, where any of the conventional plasticizers for thermoplastic resins can be used as required.

There are several variations which can be made in the above-described process when using different types of foam particles. For example, where the starting material is a polyurethane foam based on an ester or for open cell foams generally, it is advisable to add a dry thermoplastic resin to the dry foam granulate, mix well and then add a plasticizer followed by additional mixing.

For a particularly soft product, it is advisable to start with a polyurethane foam based on an ether and add the plasticizer first to the urethane resin, then granulate it, mix and then add the dry thermoplastic resin, followed by additional mixing. The addition of the plasticizer initially causes the urethane to swell, providing a greater amount of surface for the reception of the dry thrmoplastic resin as well as providing for a more uniform mixture.

It has been found that products made according to the present invention can be electronically moulded and sealed more easily, more rapidly and with less energy than foam products which have been impregnated by the more conventional methods.

The products produced according to the present invention have a wide variety of uses. They can be used for moldable cushioning materials, with or without a cover layer, for automobiles, for upholstery and temperature insulation, for sound and vibration dampening, for automobile car mats, for bathroom mats, for insulation, for packing materials, in containers and for orthopedic devices.

It should be evident that various modifications can be made to the described embodiment without departing from the scope of the present invention.

I claim as my invention:

1. The method of forming a heat and high frequency sealable foam composition which comprises providing a mixture of discrete particles of a non-heat-sealable resinous foam selected from the group consisting of polyurethane foam, phenolic foam, urea-formaldehyde foam and foam rubber and a heat gellable plastisol of a resin selected from the group consisting of acrylic resins and polyvinyl chloride, pressing the mixture into sheet form, and heating the resulting compressed mixture to the gelling temperature of said plastisol to provide a self-sustaining heat and high frequency sealable sheet material.

2. The method of claim 1 in which the resinous foam and the thermoplastic resin constituent of said plastisol are mixed dry and then mixed with a compatible liquid plasticizer in sufficient amounts to form a heat gellable plastisol.

3. The method of claim 1 in which said plastisol is present in an amount of from 50 to 500% by weight of the polyurethane foam.

References Cited

UNITED STATES PATENTS

| | | | |
|---|---|---|---|
| 2,744,291 | 4/1956 | Stastny et al. | 264—53 |
| 3,049,761 | 8/1962 | Yakubik | 264—Plastisol dig. |
| 3,676,234 | 2/1963 | Paulus | 264—Plastisol dig. |
| 3,076,234 | 2/1963 | Paulus | 264—Plastisol dig. |
| 3,193,441 | 7/1965 | Schafer | 264—321 |
| 3,401,128 | 9/1968 | Terry | 264—321 |

JULIUS FROME, Primary Examiner

L. GARRETT, Assistant Examiner

U.S. Cl. X.R.

264—53, 54, 321